United States Patent [19]

Hanley

[11] 4,009,392
[45] Feb. 22, 1977

[54] RADIATION FOCUS METER

[75] Inventor: Stephen T. Hanley, Oxon Hill, Md.

[73] Assignee: The United States of America as represented by the Secretary of the Navy, Washington, D.C.

[22] Filed: Jan. 26, 1976

[21] Appl. No.: 652,251

[52] U.S. Cl. .............................. 250/338; 250/342; 356/123
[51] Int. Cl.² ........................................ G01J 1/00
[58] Field of Search ........... 356/123, 125; 250/338, 250/342

[56] References Cited

UNITED STATES PATENTS

| | | | |
|---|---|---|---|
| 2,524,807 | 10/1950 | Kallman | 356/123 |
| 3,239,672 | 3/1966 | Gabloffsky | 250/342 |
| 3,459,945 | 8/1969 | Astheimer | 250/338 |
| 3,571,598 | 3/1971 | Lombard | 356/123 |
| 3,781,547 | 12/1973 | Thomas | 250/342 |
| 3,783,269 | 1/1974 | McConnell | 356/125 |
| 3,854,044 | 12/1974 | Stay et al. | 250/338 |

OTHER PUBLICATIONS

"Cameras Infrared Eye Focuses —" Electronics Apr. 27, 1970 pp. 102–105.

Primary Examiner—Harold A. Dixon
Attorney, Agent, or Firm—R. S. Sciascia; Philip Schneider; Melvin L. Crane

[57] ABSTRACT

A system for determining the focus point of a high power radiation beam.

6 Claims, 2 Drawing Figures

RADIATION FOCUS METER

BACKGROUND OF THE INVENTION

This invention relates to radiation beam position and more particularly to the plane at which a radiation beam is focused.

Heretofore focus spot determination for an infrared laser beam has been to direct the beam onto a piece of asbestos or plastic material and then noting the burn area. Movement of the plastic material to the plane at which the greatest burn intensity occurs determines the focal point of the beam. These techniques are time-consuming, inaccurate and involve a great deal of guess work.

SUMMARY OF THE INVENTION

This invention makes use of instrumentation which blocks a portion of radiation focused toward a detector. A portion of the radiation passes through a scanning wheel and is incident on the detector. The detector and scanning wheel as a fixed assembly may be moved toward or away from the source to locate the focal point which will be in the plane of the scanning wheel when the detector provides its output of the detector. In the event it is desired to focus radiation at a particular spot, the detector and scanning wheel assembly is moved together so that the scanning wheel is at the desired spot and the radiation is then focused toward the detector. While focusing the radiation, the detector output is observed and when the detector has the greatest output the radiation will be focused onto the plane of the scanning wheel and will be focused at the desired spot.

DETAILED DESCRIPTION

Figure 1:
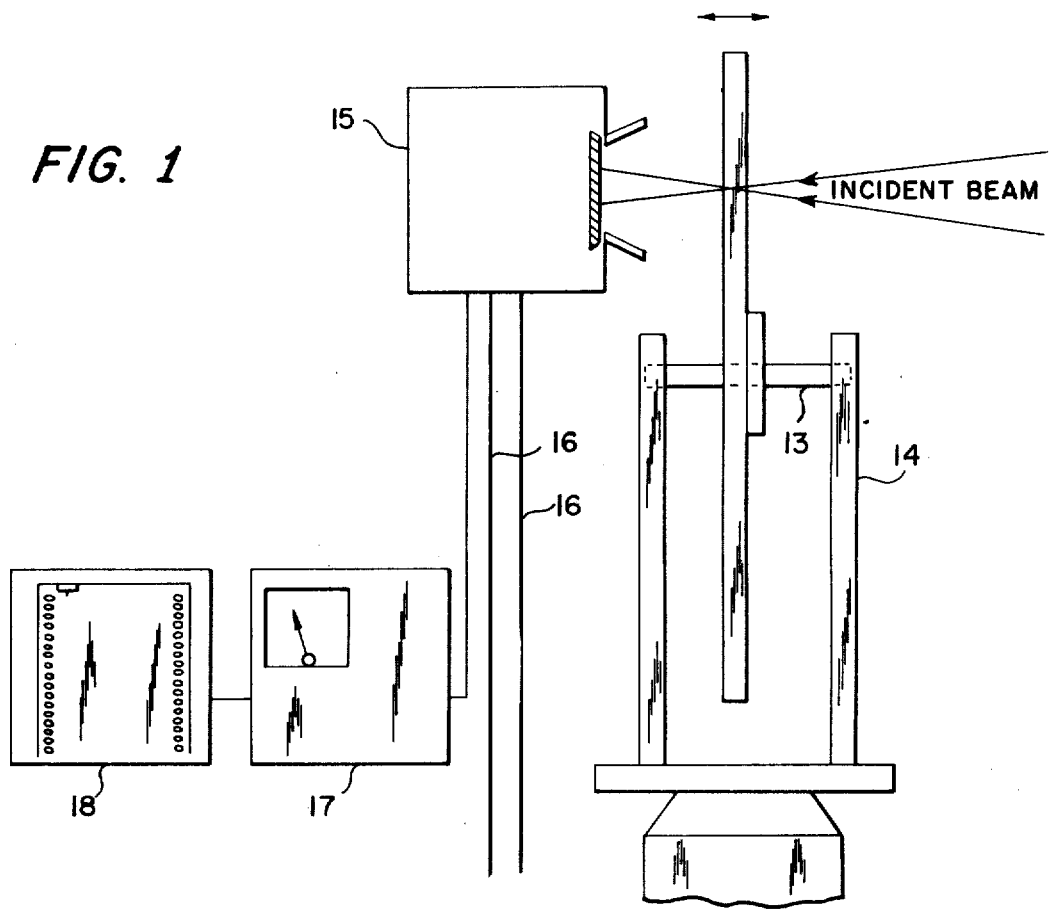
FIG. 1 illustrates a schematic drawing of the radiation focusing detector system.
Figure 2:
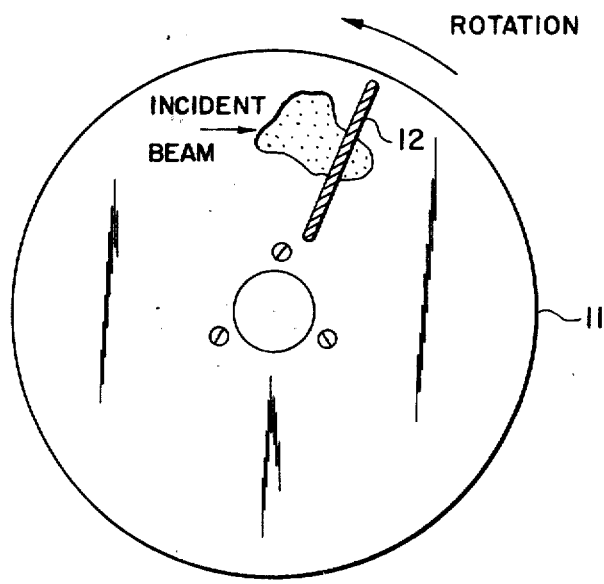
FIG. 2 illustrates a front view of a scanning rotating wheel used in the focusing system.

Now referring to the drawing, there is shown by illustration a system for determining the point of focus of a convergent radiation beam in free space. As shown, the system includes a scanning circular wheel 11 which has a radial slit 12 therein which permits radiation to pass through the slit as the slit passes through a radiation beam. The scanning wheel 11 is rotatable on an axle 13 in a suitable support 14 by any suitable drive means, electric or mechanical. The slit extends from near the axis radially outwardly to near the outer edge. The scanning wheel may be made of aluminum which is sandblasted and anodized in order to absorb as much of the incident radiation as possible with very little reflection. Thus, the radiation passes through the slot or is absorbed by the wheel surface.

A suitable radiation detector 15 such as an infrared detector is placed opposite the scanning wheel so that the plane of the wheel is parallel with the plane of the detector. The detector is supplied with a suitable voltage source for operation thereof through power lines 16 and converts incident infrared radiation into an electrical output. The output from the detector is directed into a power meter control unit 17 which amplifies the detector output signal and directs the output signal to a strip recorder 18 upon which a representative signal output is recorded.

In operation, the system is assembled as shown in FIG. 1. Radiation is focused toward the rotating scanning wheel and the detector. The radiation will be incident on the wheel surface where most of the radiation will be absorbed or reflected and only a small percentage of the radiation will pass through the slit. Transmission of radiation through the slit will be proportional to the degree of focus of the radiation in the plane of the slit in the wheel. The detector output will depend on transmission thru the slit and will be in accordance with the degree of focus in the plane of the scanning wheel. The detector scanning wheel assembly may be moved closer or spaced further from the source in order to determine the focal point of the radiation. The output of the detector will be the greatest when the focal point is at the slit of the scanning wheel.

Scan rate may be varied to allow beam profiling or averaging. The slit width may be varied to accommodate detector sensitivity and beam focal spot size. Further, the detector and scan wheel may be moved along the beam axis to determine a fixed focus position.

The above described system will permit more accurate focusing adjustments of IR type beams to be made and may be operated more rapidly than presently known systems including burning plastics, etc.

The radiation incidence side of the scan wheel may be highly polished and gold plated to reflect substantially all of the incident radiation into a power dump. Thus, high power densities may be accomodated.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of determining the focal point of a convergent radiation beam which comprises,
   scanning said radiation beam with a scan means perpendicular to said radiation beam,
   permitting only a small percentage of said radiation to pass through said scan means,
   positioning a radiation detector means at a fixed distance from said scan means for detecting radiation that passes through said scan means,
   moving said radiation detector means in unison with said scan means to a position at which said radiation detector means has the greatest output,
   whereby the position for greatest output denotes the focal point of the incident radiation.

2. A method of determining the focal point of a convergent radiation beam as claimed in claim 1 wherein:
   said scan means comprises a rotatable wheel having a radial slit therein and said detector means detects radiation which passes through said slit.

3. A system for determining the focal point of a convergent beam of radiation in free space which comprises:
   radiation detector means for detecting incident radiation and converting said detected radiation to an electrical signal;
   means connected with said radiation detector means to indicate an electrical output from said detector means due to incident radiation; and
   rotatable wheel means having a radial slit therein,
   said rotatable wheel means positioned at a fixed distance from said detector means with said radial slit in optical alignment therewith over a fraction of the rotational angle of said wheel means, whereby said radial slit permits radiation to pass to said detector means, and said detector means and said rotatable means are movable in unison along the beam path while maintaining the same spatial fixed relationship between them.

4. A system as claimed in claim 3; which includes,
a strip recorder for recording a continuous output from said radiation detector means.

5. A system as claimed in claim 3; wherein,
said rotatable wheel is treated on the radiation incidence side to absorb incident radiation that does not pass through the slit therein.

6. A system as claimed in claim 3; wherein,
the radiation incidence side of said rotatable scan wheel is highly polished and gold plated for reflecting substantially all radiation not passing through said slit.

* * * * *